US012639295B1

(12) United States Patent
Navarro et al.

(10) Patent No.: US 12,639,295 B1
(45) Date of Patent: May 26, 2026

(54) MULTI-AGENT ORCHESTRATION SYSTEM AND METHOD

(71) Applicant: Wesco Digital Solutions (Ireland) Limited, Dublin (IE)

(72) Inventors: Rafael Da Matta Navarro, Houston, TX (US); Avinash Wesley, New Caney, TX (US); Shashi Bhushan Dande, Spring, TX (US)

(73) Assignee: Wesco Digital Solutions (Ireland) Limited, Dublin (IE)

( * ) Notice: Subject to any disclaimer, the term of this patent is extended or adjusted under 35 U.S.C. 154(b) by 0 days.

(21) Appl. No.: 19/318,962

(22) Filed: Sep. 4, 2025

(51) Int. Cl.
  *G06F 16/242* (2019.01)
  *G06F 16/28* (2019.01)
(52) U.S. Cl.
  CPC .......... *G06F 16/243* (2019.01); *G06F 16/285* (2019.01)
(58) Field of Classification Search
  CPC ............................. G06F 16/243; G06F 16/285

USPC ........................................................ 707/739
See application file for complete search history.

(56) References Cited

U.S. PATENT DOCUMENTS

| | | | |
|---|---|---|---|
| 11,789,980 B2 * | 10/2023 | Jang ...................... | G06F 16/285 |
| | | | 707/739 |
| 2025/0282376 A1 * | 9/2025 | Zhang ................... | G06V 10/82 |
| 2025/0315760 A1 * | 10/2025 | Yarlagadda ...... | G06Q 10/06316 |
| 2025/0335786 A1 * | 10/2025 | Matei ...................... | G06N 5/01 |

* cited by examiner

*Primary Examiner* — Joshua Bullock
(74) *Attorney, Agent, or Firm* — K&L Gates LLP

(57) ABSTRACT

The present disclosure provides a system and method rendering enhanced multi-category query responses via orchestrated execution of trained artificial intelligent (AI) agent instances. An execution control module can receive user queries via a user interface and direct a query response module to determine semantic categories associated with the queries, generate corresponding subtasks, and select trained agent instances to execute the subtasks. Subtask responses can be validated and combined to generate a structured responses to the queries. The structured responses can be validated and presented to the users via the user interface.

18 Claims, 5 Drawing Sheets

400

Receive a natural-language query from a remote user device — 402

Determine a semantic embedding vector for the query using a domain-adapted transformer model — 404

Cluster the embedding vector into K semantic clusters via k-means clustering, each semantic cluster corresponding to a subtask category — 406

Select a respective AI agent instance from a pool of N trained AI agent instances for each semantic cluster — 408

Dispatch each semantic cluster to a selected AI agent instance for processing — 410

Validate each subtask output against predefined accuracy thresholds by computing a confidence score via a task validation module — 412

Aggregate validated subtask outputs into a final structured response by merging formatted partial results based on predefined merge rules — 414

Transmit the structured response to the remote user device for display via a user interface — 416

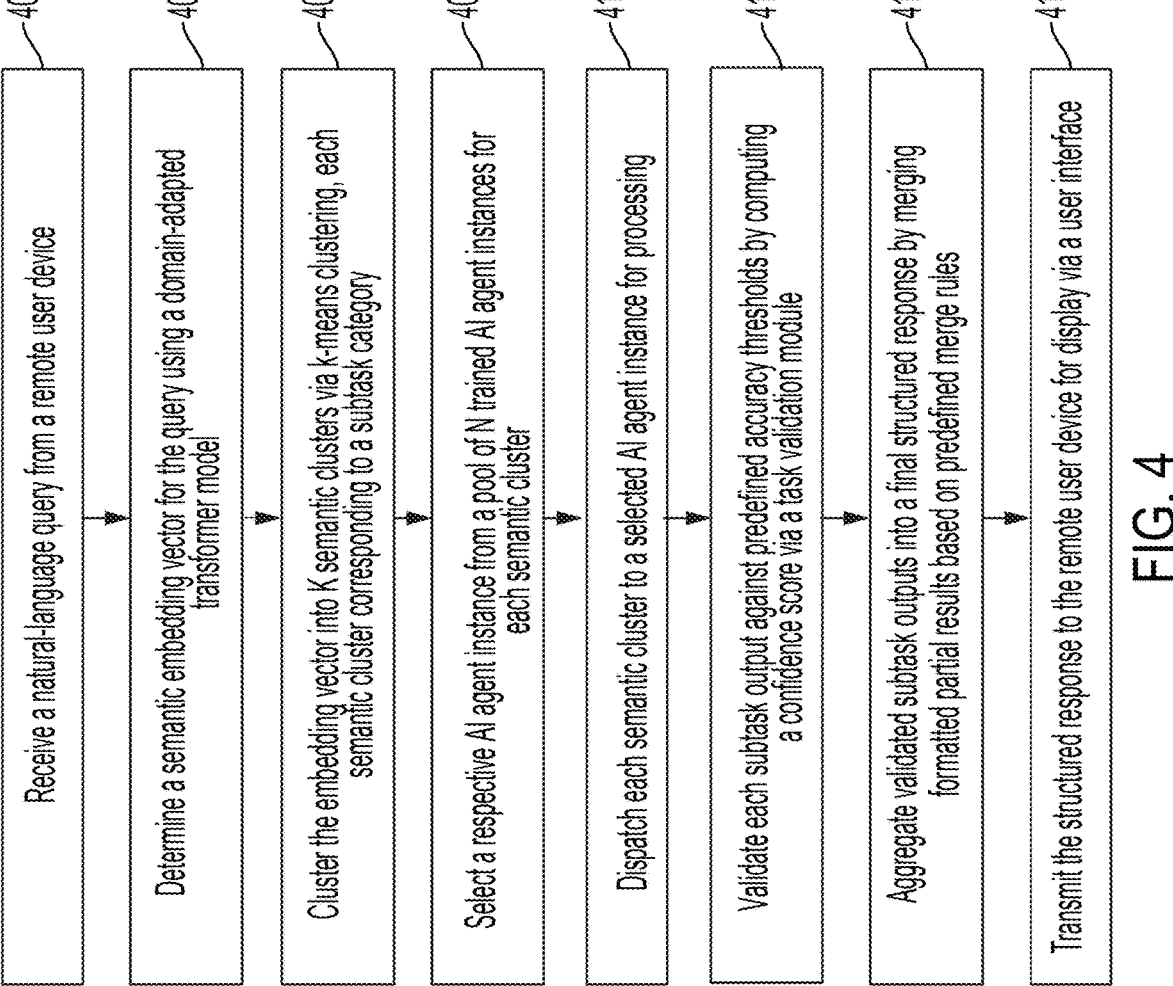

Receive a natural-language query from a remote user device — 402

Determine a semantic embedding vector for the query using a domain-adapted transformer model — 404

Cluster the embedding vector into K semantic clusters via k-means clustering, each semantic cluster corresponding to a subtask category — 406

Select a respective AI agent instance from a pool of N trained AI agent instances for each semantic cluster — 408

Dispatch each semantic cluster to a selected AI agent instance for processing — 410

Validate each subtask output against predefined accuracy thresholds by computing a confidence score via a task validation module — 412

Aggregate validated subtask outputs into a final structured response by merging formatted partial results based on predefined merge rules — 414

Transmit the structured response to the remote user device for display via a user interface — 416

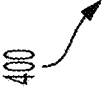
400

FIG. 4

MULTI-AGENT ORCHESTRATION SYSTEM AND METHOD

TECHNICAL FIELD

The present disclosure relates generally to the field of query response generation, and more specifically to methods and systems for utilizing agents to generate responses to complex queries.

BACKGROUND

Machine learning algorithms, including advanced language models, are becoming increasingly proficient at processing and responding to user queries. However, achieving a machine learning algorithm capable of generating accurate and comprehensive responses to complex queries that invoke multiple distinct semantic categories (e.g., topics, domains) or that require a multifaceted analysis remains a technological challenge.

Generating accurate and comprehensive responses to complex queries often requires the integration of information from diverse domains associated with different semantic categories. For example, a query requesting a detailed analysis of supply chain performance for multiple products, including an analysis of inventory levels, lead times, supplier performance, and potential risks or disruptions, invokes several domains including inventory management, supplier evaluation, and risk assessment. Addressing the query effectively can therefore require not only knowledge within each domain but also the ability to synthesize and present the information cohesively.

A single artificial intelligence (AI) agent, such as a language model, may struggle to generate responses to complex queries for various technological reasons. For example, the AI agent may lack sufficient depth of knowledge in all of the relevant domains invoked by the queries, as agent models are often trained on broad datasets that may not cover specialized topics comprehensively. Moreover, even when relevant information is available, the AI agent may struggle to prioritize and organize the response to adequately address each aspect of the query, leading to incomplete or imbalanced answers. Yet further, computational or contextual limitations of a single AI agent, such as token limits or memory constraints, may restrict its ability to maintain and synthesize large amounts of information simultaneously.

Employing multiple AI agents to address complex queries can introduce further technological challenges. For example, multiple AI agents tasked with processing a complex query may produce redundant, conflicting, or incomplete responses. Furthermore, the interaction between agents may introduce latency, inefficiencies, or errors due to miscommunication or misalignment in their processing approaches.

Accordingly, there exists a need for alternative systems and methods for generating responses to multi-category queries.

SUMMARY

In various embodiments, the present disclosure provides a computer-implemented method for rendering enhanced multi-category query responses via orchestrated execution of trained artificial intelligent (AI) agent instances. The method may be performed by a server-based execution control module including at least one processor and a memory. The method may include receiving, at the execution control module, a natural-language query from a remote user device. The method may further include determining, by the execution control module, a semantic embedding vector for the query using a domain-adapted transformer model and clustering the embedding vector into K semantic clusters via k-means clustering, each semantic cluster corresponding to a subtask category. The method may further include, for each semantic cluster, selecting, by the execution control module, a respective AI agent instance from a pool of N trained AI agent instances. The selection may be based on a stored task execution profile that indexes each AI agent instance by one or more capability vectors and a cosine-similarity calculation between a centroid vector of the semantic cluster and each of the one or more capability vectors. The method may include dispatching, by the execution control module, each semantic cluster to a selected AI agent instance for processing. Each AI agent instance may execute a cluster-specific subtask on a dedicated central processing unit (CPU) thread. The method may further include validating, by the execution control module, each subtask output against predefined accuracy thresholds by computing a confidence score via a task validation module and aggregating validated subtask outputs into a final structured response by merging formatted partial results based on predefined merge rules. The final structured response may be transmitted to the remote user device for display via a user interface.

In some embodiments of the method, clustering the embedding vector into K semantic clusters via k-means includes determining, by a semantic categorization module, semantic relevance scores for candidate semantic categories based on comparing the embedding vector of the query to stored embeddings associated with the candidate semantic categories and ranking the K semantic clusters based on the candidate semantic categories and the semantic relevance scores.

In some embodiments, the method includes determining, by the semantic categorization module, access controls associated with the query based on a credential from the remote user device and preventing, by the semantic categorization module, access to candidate semantic categories not authorized by the access controls.

In some embodiments, the method includes comparing, by the semantic categorization module, the K clusters to a hierarchy model comprising a plurality of nodes representing domain-specific terms associated with the candidate semantic categories and edges connecting the nodes representing relationships between the corresponding domain-specific terms.

In some embodiments, the method includes generating, by a subquery generation module, at least one subquery for each of the cluster-specific subtasks based on the cluster-specific subtasks and the query. The subqueries can prompt the agent instances to generate subtask the outputs based on executing the subtasks.

In some embodiments, validating each subtask output against predefined accuracy thresholds by computing a confidence score via a task validation module comprises applying, by a task validation module, a validation algorithm to verify a completeness, accuracy, and relevance of each of the subtask outputs based on the corresponding semantic cluster and subtask category.

In some embodiments, the method includes instructing, by the task execution module, at least one of the selected agent instances to re-execute a cluster-specific subtask based on a failed subtask output validation.

In some embodiments, the method includes generating, by a task response module, subtask responses by structuring the subtask outputs using a trained machine learning model.

In some embodiments, the method includes determining, by an agent selection module, the subtask parameters for each semantic cluster based on the corresponding subtask category. The subtask parameters for each semantic cluster may include one or more of a domain expertise, a computational complexity, or a data type requirement. The stored task execution profile of each AI agent instance may include one or more of a domain expertise, a computational capacity, and a data type compatibility.

In some embodiments, dispatching each cluster a selected AI agent instance for processing includes routing, by an agent call module, the cluster-specific subtasks to the corresponding selected agent instances, referencing, by the agent call module, a vector database storing domain-specific terms, relationships, and metadata to facilitate execution of the cluster-specific subtasks by the selected agent instances, and consolidating, by the agent call module, subtask outputs generated by the selected agent instances executing the subtasks.

In some embodiments, the method includes determining, by the agent call module, access controls associated with the query based on a credential from the remote user device and preventing, by the agent call module, execution of cluster-specific subtasks not authorized by the access controls.

In some embodiments, the method includes storing, by a semantic categorization module, the query and the final structured response in a trained neural network cache, retrieving, by the semantic categorization module, the structured response from the trained neural network cache for a subsequent query determined to be semantically similar to the stored query, and generating, by a response generation module, a response for the subsequent query based on the final structured response from the trained neural network cache.

In some embodiments, the method includes validating, by a response validation module prior to transmitting the final structured response to the remote user device, the final structured response by applying one or more of a rule-based algorithm to verify completeness and a semantic similarity analysis to verify relevance to the query.

In some embodiments, the execution control module issues instructions to a semantic categorization module, a task generation module, an agent selection module, a task execution module, a task validation module, and a response generation module for generating the structured response.

In some embodiments, the execution control module operates as a cloud-based orchestration platform deployed as a set of microservices.

In some embodiments, the pool of N trained AI agent instances is defined by an agent network. Each of the trained agent instances of the agent network may be trained based on domain specific data corresponding to candidate semantic categories.

In some embodiments, the method includes obtaining the query via the user interface displayed by the remote user device. The user interface may be implemented as a web-based application.

In various embodiments, the present disclosure provides a multi-agent orchestration system for rendering responses to multi-category queries. The system may include an execution control module, a plurality of query response modules, and an agent network including a pool of N trained AI agent instances. The execution control module receives natural-language queries from user devices and communicates with the agent network and the plurality of query response modules to generate structured query responses. A user interface may present the structured responses to a user.

In some embodiments, the query response modules include a semantic categorization module, a task generation module, an agent selection module, a task execution module, a task validation module, and a response generation module. The semantic categorization module may determine a semantic embedding vector for the query using a domain-adapted transformer model and the embedding vector into K semantic clusters via k-means clustering, each semantic cluster corresponding to a subtask category. The task generation module may generate cluster-specific subtasks for each query based on the semantic clusters. The agent selection module is communicatively coupled to the agent network and may select a respective AI agent instance from a pool of N trained AI agent instances. The selection may be based on a stored task execution profile that indexes each AI agent instance by one or more capability vectors and a cosine-similarity calculation between a centroid vector of the semantic cluster and each of the one or more capability vectors. The task execution module is communicatively coupled to the agent network and may dispatch each semantic cluster to a selected AI agent instances to execute the cluster-specific subtasks on a dedicated central processing unit (CPU) thread. The task validation module may validate subtask outputs against predefined accuracy thresholds by computing a confidence score. The response generation module may aggregate validated subtask outputs into final structured responses.

In various embodiments, the present disclosure provides a non-transitory computer-readable medium storing instructions. The instructions, when executed by one or more processors, cause a computing system to receive a query from a remote user device, determine a semantic embedding vector for the query using a domain-adapted transformer model, cluster the embedding vector into K semantic clusters via k-means clustering, each semantic cluster corresponding to a subtask category, and, for each semantic cluster, select a respective AI agent instance from a pool of N trained AI agent instances. The selection may be based on a stored task execution profile that indexes each AI agent instance by one or more capability vectors and a cosine-similarity calculation between a centroid vector of the semantic cluster and each of the one or more capability vectors. The instructions, when executed by one or more processors, further cause a computing system to dispatch each cluster a selected AI agent instance for processing, validate each subtask output against predefined accuracy thresholds by computing a confidence score via a task validation module, aggregate validated subtask outputs into a final structured response by merging formatted partial results based on predefined merge rules, and transmit the final structured response to the remote user device for display via a user interface. Each AI agent instance may execute a cluster-specific subtask on a dedicated central processing unit (CPU) thread.

BRIEF DESCRIPTION OF THE DRAWINGS

FIG. 4 is a flow diagram illustrating an embodiment of a method for rendering multi-category query responses via orchestrated execution of orchestrating trained AI agent instances.

DESCRIPTION

Figure 1:
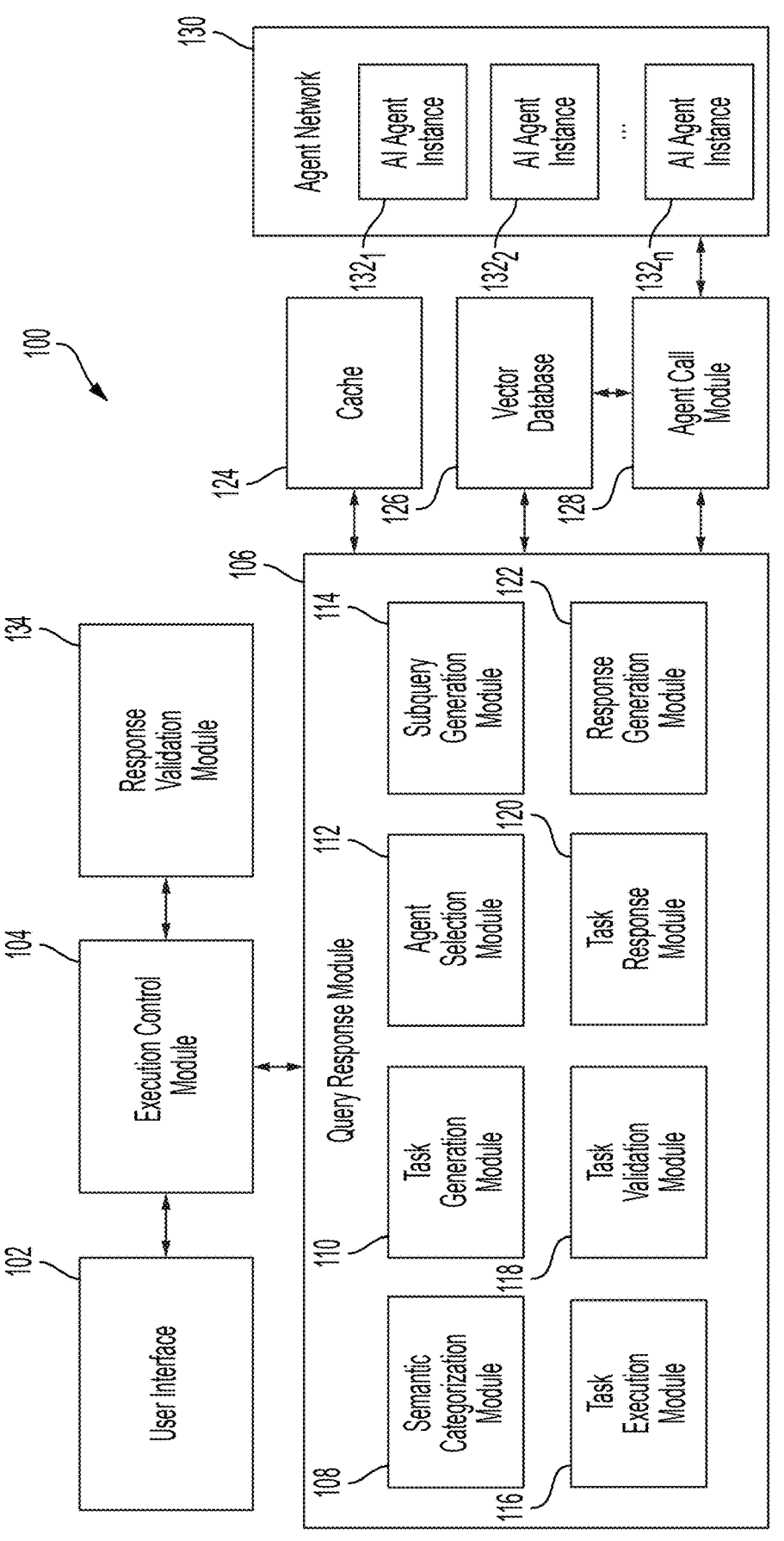
FIG. 1 is a schematic diagram illustrating an embodiment of a multi-agent orchestration system for rendering multi-category query responses.

The present disclosure provides a system and method for rendering enhanced multi-category query responses via orchestrated execution of AI agent instances. The system and method can determine semantic categories (e.g., topics, domains) associated with a complex query and generate executable subtasks for processing the query based on the semantic categories. The system and method can further select AI agent instances from a pool of trained agent instances to execute the subtasks. Different AI agent instances of the pool of trained AI agent instances may be specifically trained to process subtasks related to different semantic categories, and the AI agent instances may be selected to execute the subtasks based on their capabilities. Subtask outputs generated by the agent instances can be validated and aggregated to generate a structured response to the complex query.

The system and method can address various technological challenges related to existing approaches. For example, single-agent systems often lack the depth of knowledge required to handle complex queries spanning multiple topics or domains, and uncoordinated multi-agent systems face technological challenges related to producing redundant or conflicting responses. By using semantic categorization (e.g., via k-means clustering of an embedding vector for a query), the system and method are able to generate subtasks aligned with agent capabilities, achieving more comprehensive, accurate, and coherent results. Furthermore, the system and method can enhance computational efficiency by breaking down complex queries into manageable subtasks, and agent instance selection optimizes performance by matching subtasks to agents with specific training, capabilities, and/or availability to execute the subtasks. These technological improvements enable faster, more accurate, and comprehensive query response generation, overcoming technological challenges of static agent-based workflows and enhancing adaptability to dynamic, complex queries.

The system and method provide numerous technological advantages. For example, as discussed further herein, the use of a domain-adapted transformer model to generate a semantic embedding vector, combined with k-means clustering to partition the query into K semantic clusters, can enable precise decomposition of complex, multi-category queries into manageable subtasks. This approach improves upon traditional single-agent approaches, which often struggle to handle queries spanning multiple domains due to limited contextual understanding or computational constraints. By leveraging a transformer model specifically adapted to domain-specific data, the system and method can ensure that the semantic embedding captures nuanced relationships within the query, while k-means clustering can optimize the grouping of related concepts into distinct subtask categories. This results in a more accurate and efficient allocation of query components to specialized AI agent instances, reducing processing overhead and enhancing response coherence compared to conventional methods that rely on generic language models or manual query segmentation.

As another example, the AI agent instance selection process, which can employ a cosine-similarity calculation between the centroid vector of each semantic cluster and the capability vectors of AI agent instances, optimizes computational resource utilization, subtask execution efficiency, and subtask output accuracy. Unlike alternate multi-agent systems that may assign tasks arbitrarily or based on static rules, the system and method disclosed herein can dynamically match subtasks to AI agent instances with specialized training and capabilities, as defined by their task execution profiles. The cosine-similarity calculation can ensure that the selected AI agent instance is optimally suited to handle the corresponding subtask by quantitatively assessing the alignment between the subtask's semantic and contextual requirements and the AI agent instance's expertise, computational capacity, and data type compatibility. This precise matching can minimize the risk of suboptimal task execution, such as errors or delays caused by assigning tasks to agents lacking relevant domain knowledge or processing capabilities. By executing each cluster-specific subtask on a dedicated CPU thread, the system can further minimize latency and prevent resource contention, ensuring that computationally intensive tasks are processed concurrently without overloading system resources. The system's architecture further allows adaptability to leverage specialized hardware, such as GPUs, for compute-intensive subtasks when needed. This targeted allocation and parallel processing capability enhances the system's scalability and responsiveness, addressing inefficiencies in alternate approaches where misaligned agent assignments lead to redundant or conflicting outputs.

As yet another example, the system and method can employ validation and aggregation mechanisms to ensure high-quality, cohesive responses by systematically verifying subtask outputs against predefined accuracy thresholds and merging them using predefined rules. Alternate query response systems can produce fragmented or inconsistent results when handling multi-category queries, as they often lack robust mechanisms to validate and integrate outputs from multiple sources. In contrast, as discussed further herein, the system's task validation module may compute confidence scores to assess completeness, accuracy, and/or relevance of subtask outputs, enabling the identification and correction of suboptimal outputs before aggregation. The structured merging of validated outputs into a final response, guided by predefined merge rules, can ensure that the response is not only comprehensive but also logically organized, providing a technological improvement over alternate approaches that struggle to synthesize diverse information into a unified, user-friendly format.

Furthermore, the orchestrated execution of these processes, managed by an execution control module operating as a server-based orchestration platform, can provide a significant technological advantage by seamlessly coordinating the semantic categorization, AI agent selection, task execution, validation, and response aggregation. Unlike alternate approaches that may rely on disjointed or sequential processing pipelines, which can introduce latency and errors due to poor inter-module communication, the system and method provided herein can implement a microservices-based architecture that enables efficient, real-time interaction among specialized modules. Each module, from semantic categorization to response generation, can operate as a scalable, independent service, allowing the system to dynamically allocate resources and adapt to varying query complexities. This orchestrated approach reduces end-to-end processing time and enhances fault tolerance, as the system can reroute tasks or re-execute subtasks in response to validation failures, ensuring robust performance. By integrating these processes within a cohesive framework, the system and method overcome various limitations of alternate query response approaches, which often struggle with scalability and adaptability when processing complex, multi-category queries across diverse domains.

FIG. 1 illustrates an embodiment of a multi-agent orchestration system 100 for rendering multi-category query responses. The system 100 includes a user interface 102, an execution control module 104, and a query response module 106. The system 100 is capable of communicating with a pool of N trained AI agent instances 1321, 1322, . . . 132n (sometimes referred to collectively as AI agent instances 132 or each individually as an AI agent instance 132) included in an agent network 130. Generally, the user interface 102 obtains a multi-category query and the execution control module 104 coordinates operations of the query response module 106 to generate a structured response to the query utilizing one or more of the N trained AI agent instances 132.

The user interface 102 can obtain queries (e.g., complex, multi-category, natural-language queries) based on inputs provided by users. The user interface 102 may obtain queries that encompass a wide range of semantic categories (e.g., topics), such as multi-domain research or strategy questions (e.g., supply chain analysis queries associated with domains such as inventory, lead time and supplier performance; product development strategy queries associated with domains such as market demand, competitor features, and manufacturing costs; investment portfolio analysis queries associated with domains such as market trends, bond yields, estate returns). The user interface 102 can communicate the queries it obtains to the execution control module 104 for processing. The user interface 102 can further present structured results of processed queries to the users. The user interface 102 can enable users to input complex queries in a natural and intuitive manner and receive comprehensive responses.

The user interface 102 may obtain user queries submitted through various input methods, such as text-based input, voice commands, or structured query forms. For example, a user might submit a text-based query such as, "Provide a detailed analysis of supply change performance for products A, B, and C, including inventory levels, lead times, supplier performance, and potential risks," into a text field of the user interface 102. As another example, the user interface may include a voice-activated assistant to capture a similar spoken query, and the user interface 102 may implement natural language processing (NPL) techniques to interpret the spoken input.

The user interface 102 may present structured query responses generated by the system 100 in various formats. For example, the user interface 102 may present structured query responses in formats such as a detailed report displayed on a web page, a downloadable document summarizing the response, or an interactive dashboard including elements (e.g., charts, graphs, images) for summarizing metrics of various domains associated with the query.

The user interface 102 can implement a user interface accessible by remote user devices (e.g., laptops, tablets, smartphones) via a communication network (e.g., the Internet, a private intranet). The user interface 102 may be implemented, for example, as a web-based application, a mobile application, or desktop application, accessible via the user device connected to the network. The user interface 102 may be configured using various frameworks, such as (HyperText Markup Language) HTML, Cascading Style Sheets (CCS) or JavaScript. For voice-based interactions, the user interface 102 may integrate with speech-to-text services, such as those provided by cloud-based platforms, to convert spoken queries into text for processing.

The user interface 102 may implement various user authentication mechanisms to enable the system 100 to enforce access controls. For example, the user interface 102 may use an authentication mechanism to validate user credentials and permissions. Access controls may be enforced by mapping user roles or permissions to specific semantic categories, ensuring that users only receive responses to queries or portions of queries to which they are authorized to access.

The execution control module 104 can coordinate operations of the query response module 106 to produce structured, comprehensive responses to multi-category queries obtained by the user interface 102. The execution control module 104 can receive a query from the user interface 102 and orchestrate the processing of the query by issuing instructions to the various modules of the query response module 106. For example, upon receiving a query from the user interface 102, the execution control module 104 can initiate a query processing and response generation workflow that directs the query to the appropriate module of the query response module 106 for initial processing, such as semantic analysis to identify semantic categories for the query. The execution control module 104 can further cause appropriate modules of the query response module 106 to generate subtasks, select suitable AI agent instances 132 from the agent network 130 to execute the subtasks, and generate a response based on aggregating responses to the subtasks. The execution control module 104 can manage the flow of data between modules of the query response module 106, ensuring that intermediate outputs, such as semantic categories, subtasks, or subtask responses, are communicated to the appropriate module for executing the query processing and response generation workflow.

The query response module 106 includes a plurality of different modules each for executing a specific aspect of the query processing and response generation workflow managed by the execution control module 104. The plurality of modules can include a semantic categorization module 108, a task generation module 110, an agent selection module 112, a subquery generation module 114, a task execution module 116, a task validation module 118, a task response module 120, and/or a response generation module 122. The modules of the query response module 106 can work in a coordinated manner, under the direction of the execution control module 104, to determine semantic categories associated with a multi-category query, assign subtasks to appropriate AI agent instances 132 based on the determined categories to generate subtask responses, and generate a comprehensive response based on the subtask responses.

The semantic categorization module 108 of the query response module 106 can analyze incoming user queries to determine one or more semantic categories associated with each query. The semantic categorization module 108 can decompose complex, multi-category queries based on comparing the queries to distinct candidate semantic categories (e.g., topics, domains). Determining the semantic categories associated with a query can enable the system 100 to utilize appropriate AI agent instances 132 within the agent network 130 to address the query. This can enable the system 100 to generate a more comprehensive and accurate response to the query compared to single agent approaches.

The semantic categorization module 108 can determine the semantic categories associated with a query by generating a vector representation of the query, for example, using natural language processing (NPL) techniques such as transformer-based models or word embeddings (e.g., Bidirectional Encoder Representations from Transformers (BERT), Word2Vec). The vector representation can capture the semantic content of the query in a high-dimensional vector space. The vector representation of the query may be referred to as a semantic embedding vector for the query. The semantic categorization module 108 can compare the vectorized query to embeddings of candidate semantic categories stored in a vector database 126 to determine which of the candidate semantic categories are associated with the query. The vector database 126 may store precomputed embeddings for the candidate semantic categories. For example, related to a supply chain management query, candidate semantic categories corresponding to embeddings stored by the vector database 126 may include "inventory management," "supplier performance," "market trends," and other supply chain-related domains.

In some examples, the semantic categorization module 108 may use k-means clustering for identifying semantic categories. The semantic categorization module 108 may determine a semantic embedding vector for the query using a domain-adapted transformer model and grouping the vector into different semantic clusters. The semantic categorization module 108 may employ a k-means clustering algorithm that partitions a set of embedding vectors into K clusters by minimizing the variance within each cluster. Each cluster may be represented by a centroid, computed as the mean of the embedding vectors assigned. Each cluster may correspond to a distinct subtask category (e.g., semantic category). The k-means algorithm may iteratively assign the semantic embedding vector to the cluster with the nearest centroid based on a distance or similarity metric, such as Euclidean distance or cosine distance similarity.

The semantic categorization module 108 may calculate semantic relevance scores for candidate embeddings by measuring the similarity (e.g., cosine similarity, Euclidean distance) between the query's vector representation and the embeddings of the candidate semantic categories. A threshold may be applied to filter out candidate semantic categories with low relevance scores. Candidate semantic categories with relevance scores above a threshold may be considered matches to the query. The semantic categorization module 108 may rank the matching semantic categories (e.g., the semantic clusters) based on the relevance scores, and the ranking may be used to select the semantic categories most relevant to the query. In some embodiments, the ranking of the semantic categories may be used to prioritize the order of subsequent subtask generation, agent assignment, and/or subtask execution.

The embeddings stored by the vector database 126 may be generated using machine learning models trained on domain-specific data, ensuring that each candidate semantic category accurately represents its corresponding domain or topic.

In some embodiments, each of the candidate semantic categories represented in the vector database 126 may correspond to one or more trained AI agent instances 132 in the agent network 130. For example, a trained AI agent instance 132 corresponding to a candidate semantic category represented in the vector database 126 may be specifically trained to handle tasks associated with the semantic category (e.g., domain, topic).

The vector database 126 may incorporate a hierarchy model and/or ontology model. The model may include nodes and edges. Nodes may represent domain specific terms (e.g., "inventory turnover" or "lead time") and edges may represent relationships between the terms (e.g., hierarchical or associative links). Using a hierarchy model and/or ontology model can support a nuance semantic categorization, thereby enabling the system 100 to identify related or parent-child type semantic categories and improve the precision of category determination.

In some examples, the semantic categorization module 108 may implement a hierarchical approach for determining the semantic categories associated with the query (e.g., semantic clusters for the embedding vector of the query). For example, initial clusters may be grouped into broader categories using additional rounds of k-means clustering or hierarchical clustering techniques. The hierarchical approach may enable the semantic categorization module 108 to organize the query according to semantic categories based on multi-level taxonomy. For example, semantic categories may be arranged according to both a fine-grained and course-grained categorization, grouping more specific subcategories together based on broader high-level categories.

The semantic categorization module 108 may implement access controls to restrict access to specific semantic categories based on predefined user permissions. For example, a user may lack permission to access sensitive categories such as "supplier contracts" in a supply chain analysis query (e.g., due to confidentiality or role-based restrictions). The semantic categorization module 108 can evaluate user permissions, which may be stored in the vector database 126 or a separate access control database, by cross referencing the user's credentials with semantic categories identified for the query. If a user lacks permission for a semantic category, such as "supplier contracts," the semantic categorization module may exclude that category from further analysis during processing of the query. The system 100 may generate a result based on remaining semantic categories of the query that the user does have permission to access. The semantic categorization module 108 may cause the user interface 102 to report categories that have been blocked to the user.

The semantic categorization module 108 processing an incoming query may reference a cache 124 to determine whether a response to a semantically similar query has already been generated by the system 100. For example, before proceeding with determining the semantic categories associated with the incoming query, the semantic categorization module 108 may compare the query to stored entries in the cache 124. The cache 124 can serve as a repository for previously processed queries and their corresponding structured responses. In some embodiments, the cache 124 may be a trained machine learning model cache (e.g., a large language model (LLM) cache). The cache 124 can enable rapid retrieval of responses for queries that are identical or semantically similar to incoming queries. If a match is identified in the cache 124, the semantic categorization module 108 can provide an indication of the match to the execution control module 104. The execution control module 104 can cause the query response module 106 (e.g., the response generation module 122 discussed further herein) to retrieve the cached response and adapt it for presentation to the user via the user interface 102. Implementing the cache 124 can bypass the need for further processing of an incoming query by other modules of the query response module 106, improving computational efficiency.

To utilize the cache 124, the semantic categorization module 108 may generate a vector representation of the incoming query, for example, as discussed above. The cache 124 may store vector representations of the previously processed queries paired with their structured responses. The semantic categorization module 108 may compare the vector representation of the incoming query to those of the previously processed queries stored by the cache 124 to compute semantic similarity scores. Matching queries in the cache 124 may be identified based on semantic similarity scores exceeding a predefined similarity threshold. The cache 124 (e.g., implemented as an LLM cache) may be optimized for handling high-dimensional embeddings and large volumes of query-response pairs. Time-to-live (TTL) settings may be used to manage cache expiration and maintain relevance.

By referencing the cache 124 prior to identifying semantic categories and executing corresponding tasks utilizing AI agent instances 132 agent network 130, the semantic categorization module 108 may avoid the computational expense associated with utilizing the AI agent instances 132. This approach can reduce the demand for computational resources, such as processing power and memory, reduce response latency, and provide a more efficient user experience. When a cache miss occurs (e.g., when no match is identified in the cache 124) for an incoming query, the semantic categorization module 108 and remaining modules of the query response module 106 may proceed with generating a new structured response for the query. The query response module 106 may add the query, paired with the new structured response, to the cache 124. The cache update process may be managed to maintain storage efficiency using techniques such as last-recently-used (LRU) eviction policies or the TTL settings referenced above.

The task generation module 110 of the query response module 106 can generate subtasks that are executable by AI agent instances 132 of the agent network 130. The subtask may be executable to produce subtask responses corresponding to the semantic categories of a query identified by the semantic categorization module 108. Thus, the subtasks may be cluster-specific subtasks that correspond to the semantic clusters identified by the semantic categorization module 108. The task generation module 110 receives the determined semantic categories from the semantic categorization module 108 (e.g., based on instructions by the execution control module 104). The task generation module 110, based on the determined semantic categories, can decompose the query into discrete subtasks for addressing specific aspects of the query associated with the semantic categories. The task generation module 110 can determine the subtasks such that a combination of subtask responses generated by the AI agent instances 132 executing the subtasks can be used to collectively form a comprehensive response to the query.

The task generation module 110 may employ natural language processing (NPL) and/or categorization techniques to generate the subtasks based on the semantic categories associated with the query. The task generation module may utilize techniques such as named entity recognition (NER), dependency paring, or intent classification to extract concepts and relationships within the query that align with the identified categories. For example, for a query requesting "analysis of supply chain performance including inventory levels and supplier performance" and determined to have semantic categories of "inventory management" and "supplier evaluation," the task generation module 110 may generate subtasks such as "retrieve and analyze inventory data" and "evaluate supplier reliability metrics." The task generation module 110 may leverage trained machine learning models, such as transformer-based models, to infer task boundaries and priorities based on the query's structure and the semantic categories, thereby optimizing the granularity of the subtasks to match the capabilities of available AI agent instances 132 in the agent network 130.

The agent selection module 112 of the query response module 106 can select at least one AI agent instance 132 from the agent network to execute each of the subtasks generated by the task generation module 110. The agent selection module 112 can ensure that each subtask generated for a query is assigned to at least one AI agent instance 132 with the appropriate expertise and capabilities to produce accurate and relevant subresponses. The agent selection module 112 may select the one or more AI agent instance 132 for each subtask based on one or more subtask parameters that define requirements and/or characteristics of the subtask. By matching the subtask parameters to the capabilities of the AI agent instances 132, the agent selection module 112 can optimize the execution of the subtasks, enabling the system 100 to efficiently address diverse semantic categories of a query to produce comprehensive, cohesive, high-quality task responses.

The subtask parameters used by the agent selection module 112 may be derived from the nature of the subtask and its associated semantic category. The agent selection module 112 may compare the subtask parameters to task execution profiles associated with the AI agent instances 132 of the agent network 130 to select the at least AI agent instance 132 for executing each subtask. The task execution profile of an AI agent instance 132 may describe its capabilities, training, compute requirement, and/or performance characteristics. The subtask parameters for a subtask may include parameters such as domain expertise (e.g., specifying a domain or topic associated with the semantic category of the subtask), computational complexity (e.g., quantifying processing resources required by the subtask), data type requirements (e.g., specifying whether the subtask relates to analyzing numerical data, textual data, image data, etc.), and/or response time constraints (e.g., defining the expected latency for subtask completion). Domain expertise may be used by the agent selection module 112 to identify AI agent instances 132 trained on corresponding domain-specific data. Computational complexity may be used by the agent selection module 112 to identify AI agent instances 132 with sufficient computational capacity for the subtask. Data type requirements may be used by the agent selection module 112 to identify AI agent instances 132 capable of or optimized for handling the data formats associated with the subtask. Response time constraints may be used by the agent selection module 112 to identify AI agent instances 132 capable of satisfying the constraints. The agent network 130 may store one or more task execution profiles that index each of the AI agent instances 132 based on one or more capability vectors.

The subtask parameters may be determined by the agent selection module 112 or the task generation module 110 by analyzing the subtask's structure, content, and associated semantic category, for example, using NPL techniques such as intent classification or metadata extraction. The agent selection module 112 may employ a matching algorithm, such as a weighted scoring system or machine learning-based classifier, to compare subtask parameters with agent selection profiles and select suitable AI agent instances 132 for the subtasks. Additionally, or alternatively, the agent selection module 112 may consider factors for selecting the select AI agent instances 132, such as agent availability, historical agent performance, and/or cost associated with utilizing AI agent instances 132, to enhance the efficiency of the system 100.

In some examples, the agent selection module 112 may select the AI agent instances 132 based on the capability vectors of the AI agent instances 132 and the centroid vectors of the semantic clusters. The capability vectors for the AI agent instances 132 may be generated based on task execution profiles of the AI agent instances 132. The capability vectors may be generated utilizing a standardized embedding process. The centroid vector of each semantic cluster may encapsulate the semantic and contextual characteristics as well as the subtask parameters of the corresponding cluster-specific subtasks. To select an AI agent instance 132 for a specific subtask, the agent selection module 112 may perform a cosine similarity calculation between the centroid vectors of the corresponding semantic cluster and the capability vectors of the AI agent instances 132. The cosine similarity calculation can quantify the alignment between the subtask's requirements and the capabilities of each of the AI agent instances 132. A higher cosine similarity score indicates a stronger match. Thus, for a particular subtask, the agent selection module 112 may select the AI agent instance 132 associated with the highest similarity score. In cases where multiple capability vectors per AI agent instance 132 are used, the agent selection module 112 may computed a weighted average of cosine similarities or select the AI agent instance 132 maximizing the minimum similarity across multiple subtask parameters.

The subquery generation module 114 of the query response module 106 can generate one or more subqueries for each of the subtasks. The subquery generation module 114 may serve as a query rewriter to reformulate the query into targeted subqueries corresponding to the subtasks. The subqueries generated by the subquery generation module 114 can enhance clarity and facilitate execution by the selected AI agent instances 132, ensuring that each subquery aligns with the specific requirements of the corresponding subtask. By transforming the query into discrete, contextually relevant subqueries, the subquery generation module 114 can enable the selected AI agent instances 132 to focus on specific aspects of the query, thereby improving the accuracy and efficiency of the task responses.

The subquery generation module 114 may utilize natural language processing (NPL) techniques to generate the subqueries, such as query rewriting, paraphrasing, or intent extraction, to reformulate the query into subqueries adapted for processing by the selected AI agent instances 132. For example, for a subtask related to "inventory management" from a query including "Analyze supply chain performance for product X . . . ," the subquery generation module 114 may generate a subquery such as "Calculate the inventory turnover rate from product X over the past quarter." The subquery generation module 114 may use techniques such as dependency parsing to identify phrases or entities in the query and map them to the subtask's semantic category. The subquery generation module 114 may use transformer-based models (e.g. Bidirectional Auto-Regressive Transformers (BART), Text-to-Text Transfer Transformer (T5)) to rephrase the query into a format that aligns with the capabilities of a selected AI agent instance 132.

The subquery generation module 114 can improve understanding of the query by the selected AI agent instances 132 by simplifying complex query structures, resolving ambiguities, and/or incorporating domain specific terminology specific to the selected AI agent instances 132. In some embodiments, the subquery generation module 114 may utilize metadata from the agent selection module 112, such as the task execution profile (e.g., domain expertise, data preference types) of the selected AI agent instance 132, to generate a subquery adapted to the selected AI agent instance 132. This can ensure that each subquery is formatted to optimize the performance of the selected AI agent instance 132, thereby enhancing the quality and relevance of the task responses.

The task execution module 116 of the query response module 106 may manage the execution of the subtasks (generated by the task generation module 110) by the selected AI agent instances (selected by the agent selection module 112) to generate subtask outputs. The task execution module 116, based on instructions from the execution control module 104, can receive the subtasks and/or semantic clusters and the one or more AI agent instances 132 selected to execute each of the subtasks. The task execution module 116 can dispatch each semantic cluster to the selected AI agent instances 132 within the agent network 130 to execute the corresponding cluster-specific subtasks. The task execution module 116 can collect the subtask outputs generated by the AI agent instances 132 for further processing by modules of the query response module 106 to generate the subtask responses.

The task execution module 116 may utilize an agent call module 128 to facilitate communication with the AI agent instances 132 of the agent network 130. The task execution module 116 may provide the agent call module 128 with the subtasks, semantic clusters, and/or details associated with each subtask, such as the one or more AI agents instances 132 selected for the subtask and one or more subqueries associated with the subtask. Based on the information provided by the task execution module 116, the agent call module 128 can establish communication with the correct AI agent instances 132, for example, through communication interfaces such as Application Programming Interfaces (APIs) or message-passing protocols. The agent call module 128 can route each subtask to the one or more selected AI agent instances 132.

The agent call module 128 may reference the vector database 126 to support subtask execution and information retrieval by accessing embeddings or hierarchy models for contextual information relevant to the subtasks. For example, when executing a subtask related to a specific semantic category, such as "supplier performance," the agent call module 128 may query the vector database 126 to retrieve domain-specific terms, relationships, or metadata (e.g., supplier reliability metrics, historical performance data) to enhance the ability of the executing AI agent instance 132 to generate an accurate subtask output.

Subsequent to execution of the subtasks by the AI agent instances 132, the agent call module 128 can consolidate the subtask outputs to ensure they are properly collected and formatted for further processing. For example, where multiple AI agent instances 132 are assigned to a particular subtask, the agent call module 128 may aggregate the outputs from the multiple AI agent instances 132 to generate the subtask outputs. The consolidated subtask responses may be transmitted to the task execution module 116 using similar communication interfaces as those referenced above (e.g., APIs, message-passing protocols).

The agent call module 128 may utilize communication frameworks, such as RESTful APIs, Remote Procedure Call (gRPC), and/or message queue systems, to facilitate interaction between the task execution module 116 and the AI agent instances 132. The agent call module 128 may be enabled to handle asynchronous communication, allowing it to manage multiple simultaneous requests to different AI agent instances 132. For example, it may use serialization techniques to serialize subtask data, including subquery and AI agent instance ID, to ensure reliable data transfer. The agent call module 128 may utilize load balancing and retry mechanisms to handle agent availability issues. Security protocols may be employed by the agent call module 128 to authenticate and authorize communication with the AI agent instances 132, for example, when accessing the agent network 130 implemented as cloud-based or distributed agent network, to maintain integrity and security of the task execution process.

The task execution module 116 can enforce access controls to regulate the execution of subtasks and/or the use of specific AI agent instances 132 to ensure compliance with user permissions. The task execution module may evaluate access controls by cross-referencing user credentials or roles (e.g., provided via the user interface 102) against the semantic categories or AI agent instances associated with each subtask. For example, if a subtask pertains to a restricted semantic category such as "supplier contracts," and the user lacks permission to access this domain, then the task execution module 116 may prevent the agent call module 128 from dispatching the subtask to the corresponding AI agent instance 132 and/or may flag the subtask as restricted via a notification through the user interface 102. By enforce access controls, the task execution module 116 can ensure that only authorized subtasks are executed. In some embodiments, if access to a particular subtask is blocked, the task execution module 116 may proceed with execution of the remaining subtasks. In other embodiments, the task execution module 116 may block the execution of all subtasks associated with the corresponding query.

The task validation module 118 of the query response module 106 can validate each subtask output generated by the AI agent instances 132 to ensure their accuracy and relevance. The task validation module 118, based on instructions from the execution control module 104, may receive subtask outputs from the task execution module 116. The task validation module 118 may evaluate the subtask outputs based on predefined criteria, such as a predefined accuracy threshold and/or a predefined relevance threshold. The predefined criteria may be determined by the task validation module 118 based on the subtask and its corresponding semantic category. Subtask output validation can ensure that each subtask output is complete, accurate, and contextually appropriate, addressing technological challenges related to generating incomplete or irrelevant query responses.

The predefined criteria for validating a subtask output may be determined by the task validation module 118 based on the subtask's requirements and the semantic category it addresses. For example, the predefined criteria may include subtask output completeness, subtask output accuracy, and subtask output relevance. The subtask output completeness criterion may be used to assess whether the subtask output includes all of the information required by the subtask. The subtask output accuracy criterion may be used to assess whether the data or analysis provided in the subtask output aligns with verifiable facts or expected outcomes. The subtask output relevance criterion may be used to assess whether the output directly addresses the subtask's objectives, ensuring that the response focuses on its corresponding semantic category.

To perform subtask validation, the task validation module 118 may employ validation algorithms, such as rule-based checks to verify data completeness (e.g., against predefined templates), statistical methods to compare numerical outputs against expected ranges (e.g., using z-scores or confidence intervals), or NPL techniques, such as semantic similarity scoring with transformer modules, to assess textual relevance. These techniques may enable the task validation module 118 to flag invalid or suboptimal outputs, which may be sent by the execution control module 104 back to the task execution module 116 for reprocessing and/or reported to the user interface 102.

The task response module 120 of the query response module 106 can receive the validated subtask outputs generated by the AI agent instances 132 and formulate the subtask outputs into structured subtask responses for each subtask. The task response module 120 may transform raw or intermediate outputs from the AI agent instances 132, which may include numerical data, textual analyses, or other domain-specific results, into coherent and contextually appropriate subtask responses that align with the requirements of the corresponding subtasks and their associated semantic categories. The task response module 120 may employ trained machine learning algorithms and/or response generation techniques to refine and structure the outputs to ensure that the subtask responses are clear, accurate, and suitable for integration into a final structured query response.

The task response module 120 can reformulate the subtask outputs into subtask responses using artificial intelligence models and/or NPL techniques tailored to the nature of the outputs and the subtask's semantic category. For example, if an AI agent instance 132 produces a numerical output, the task response module 120 may use a transformer-based language model to generate a textual summary that contextualizes the data. For textual output, the task response module 120 may apply paraphrasing or summarization techniques to condense and clarify content for conciseness and relevance. The task response module 120 may employ template-based response generation, where predefined response structures are populated with data from subtask output, or employ generative AI models to create narrative responses that align with the query's intent. The task response module 120 may use metadata from the subtask, such as its semantic category or user preferences, to tailor the response format (e.g., bullet points, paragraphs, or tables) for compatibility with downstream processing by the response generation module 122.

The response generation module 122 of the query response module 106 can aggregate (e.g., combine and consolidate) the subtask responses generated into a cohesive, structured response for the complex, multi-category query. The response generation module 122 receives the subtask responses from the task response module 120 and can integrate them to produce a response to the query that comprehensively addresses each component of the query. The response generation module 122 can ensure that the response is clear, organized, and contextually appropriate, generating the information in a format presentable to the user via the user interface 103.

The response generation module 122 can employ aggregation techniques and/or trained machine learning models to combine subtask responses into a structured query response. For example, the response generation module 122 may use NPL techniques, such as summarization or coherence modeling, to merge textual subtask responses into a cohesive narrative, ensuring logical flow and eliminating redundancy. For structured data, the response generation module 122 may apply template-based formatting or data fusion algorithms to organize numerical or tabular outputs into unified visualizations, such as charts or tables. The response generation module 122 may use transformer-based models to rephrase or enhance the combined response for clarity or readability. The final response can be passed to the execution control module 104 for validation by the response validation module 134 before presentation via the user interface 102.

The system 100 may employ a response validation module 134 to ensure the accuracy and relevance of the query response generated by the execution control module 104 and the query response module 106 before presenting the response to the user via the user interface 102. The response validation module 134 may receive the query response from the execution control module 104 and evaluate it against validation criteria to confirm that the response comprehensively addresses each aspect of the query. By performing this validation of the final query response, the response validation can ensure that the response aligns with the user's intent and meets standards of the system 100 for reliability, mitigating issues such as incomplete or irrelevant information that could arise from the integration of multiple subtask responses.

To validate the response, the response validation module 134 may employ validation techniques based on the query's semantic categories and requirements. For example, the response validation module 134 may use rule-based validation algorithms to check the response for completeness, ensuring that all identified semantic categories are adequately addressed in the response. The response validation module 134 may employ semantic similarity analysis techniques, for example, using transformer-based models, to measure the relevance of the response by comparing its content to the original query's vector representation, ensuring that the response aligns with the user's intent. The response validation module 134 employ fact-checking algorithms that cross reference numerical or factual data in the response against an external database and/or the vector database 126.

In some embodiments, if the response validation module 134 identifies issues with the response, such as missing information, irrelevant information, or discrepancies, the response validation module 134 may flag the response for revision (e.g., by the response generation module), may trigger the execution control module 104 to reprocess one or more specific subtasks associated with identified issues, and/or may trigger the execution control module 104 to reprocess the query with modifications to the query processing workflow based on the identified issues (e.g., determining different semantic categories, selecting different AI agent instances 132).

The agent network 130 may serve as a distributed framework that hosts the AI agent instances 132. The agent network 130 may be implemented via a distributed computing environment hosted on a cloud-based platform using containerized services. Each of the AI agent instances 132 may be a trained machine learning model, such as a transformer based large language model. The AI agent instances 132 may be trained on datasets relevant to specific domains or topics. The models may be hosted as microservices (e.g., accessible via RESTful APIs or gRPC endpoints) allowing the agent call module 128 to send subtasks and receive outputs efficiently. Each of AI agent instances 132 may be associated with a task execution profile detailing the AI agent instance's expertise, computational requirements, and/ or supported data types, stored in a metadata repository associated with the agent network 130.

The execution control module 104 may be implemented across a distributed service hosed on a cloud platform using containerized environments. The execution control module 104 may operate as a workflow management system utilizing message queue systems and/or event driven architectures to issue instructions to the query response module 106. The execution control module 104 may employ a microservices architecture, where each function (e.g., query routing, task monitoring) is encapsulated as a separate service.

The query response module 106 may be implemented as a modular system comprising multiple submodules (e.g., the semantic categorization module 108, the task generation module 110, etc.), each deployed as a microservice within a cloud-based environment. Any of the submodules may employ specialized machine learning models, for example, as discussed further herein. The query response module 106 may communicate internally via APIs or message-passing protocols. The query response module 106 may employ caching mechanisms, such as an LLM cache, to store intermediate results and optimize performance.

The response validation module 134 may be implemented as a service via a cloud infrastructure (e.g., along with the query response module 106). The response validation module 134 may communicate with the execution control module 104 via APIs or message-passing protocols.

Figure 2:
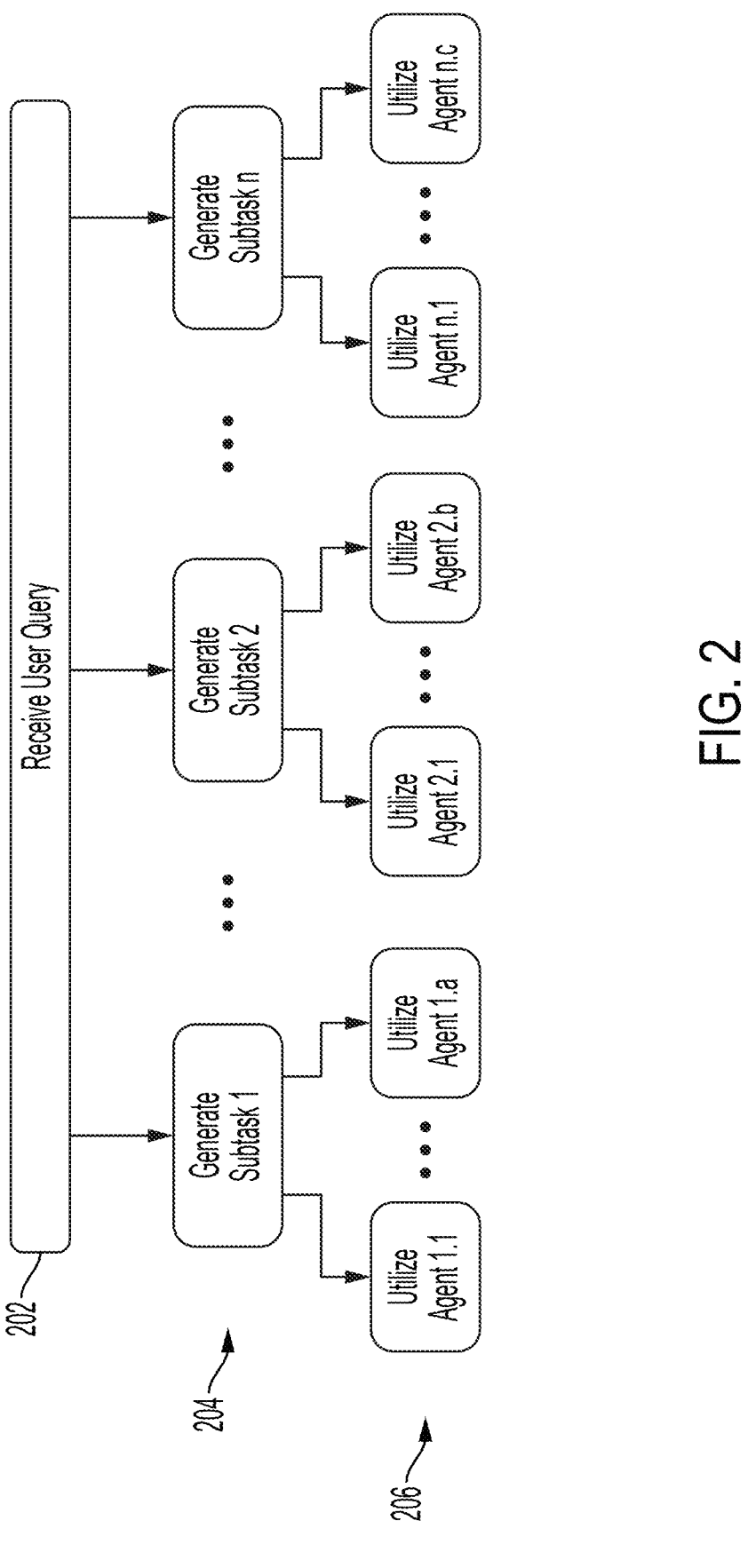
FIG. 2 is a flow diagram illustrating an embodiment of a method for rendering multi-category query responses.

FIG. 2 is a flow diagram illustrating an embodiment of a method 200 for rendering multi-category query responses. The method 200 may be implemented using the system 100. Any aspects of the system 100 and/or method 200 may be combined with any of the other embodiments of the system and/or method disclosed herein, and vice versa.

According to the method 200, the user interface 102 receives 202 a user query. The query may be a complex, multi-category, natural-language query. The query response module 106 generates 204 a plurality of subtasks (e.g., Subtask 1, Subtask 2, . . . . Subtask n) for responding to the query. For example, the query response module 106 may determine a plurality of semantic categories associated with the query. The query response module 106 may generate a different subtask for each of the semantic categories associated with the query. The query response module 106 may further assign one or more AI agent instances 132 to execute the subtasks. For example, the query response module 106 may assign AI agent instances 132 to the subtasks based on the semantic categories associated with the subtasks, the capabilities of the AI agent instances 132, the availability of the AI agent instances 132, the requirements of the subtasks, etc.

According to the method 200, the query response module 106 utilizes 206 a plurality of AI agent instances to execute the generated subtasks. For example, as noted above, one or more AI agent instances 132 may be assigned to each subtask (e.g., for Subtask 1, Agent 1.1, Agent 1.2, . . . and Agent 1.a are utilized; for Subtask 2, Agent 2.1, Agent 2.2, . . . and Agent 2.b are utilized; for Subtask n, Agent n. 1, Agent n.2, . . . and Agent n.c are utilized). The query response module 106 may combine the outputs from the AI agent instances 132 executing the subtasks to generate a response to the query. The user interface 102 may present the generated response.

Figure 3:
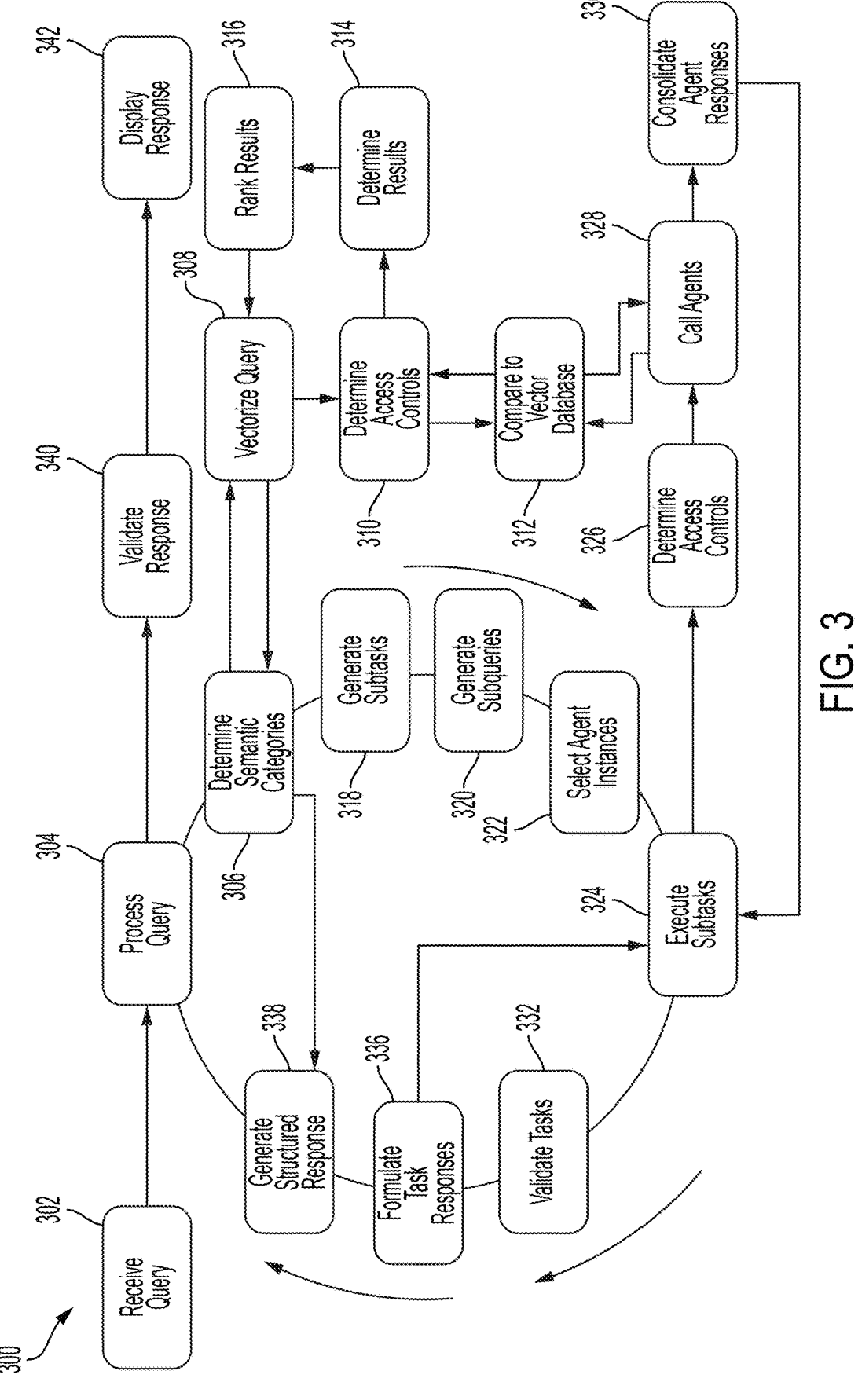
FIG. 3 is a flow diagram illustrating an embodiment of a method for rendering multi-category query responses.

FIG. 3 is a flow diagram illustrating an embodiment of a method 300 for rendering multi-category query responses. The method 300 may be implemented using the system 100. Any aspects of the system 100 and/or method 300 may be combined with any of the other embodiments of the system and/or method disclosed herein, and vice versa.

According to the method 300, the user interface 102 receives 302 a user query. The query may be a complex, multi-category query. The execution control module 104 processes 304 the received query by managing operations the query response module 106, as discuss further with respect to the method 300.

According to the method 300, to process 304 the query, the query response module 106 determines 306 sematic categories associated with the query. To determine the semantic categories, the query response module 106 may vectorize 308 the query, determine access controls 310 associated with the user submitting the query, and compare 312 the vectorized query to the vector database 126. The vector database 126 may include embeddings corresponding to candidate semantic categories for the query. The query response module may determine 314 the results of determining the access controls and comparing the vectorized query to the vector database by identifying embeddings matching the vectorized query and filtering out any embeddings corresponding to candidate semantic categories that the user is not authorized to access. The query response module may rank 316 the results based on the similarity of the matching embeddings to the vectorized query.

According to the method 300, to process 304 the query, the query response module 106 generates 318 subtasks based on the determined semantic categories. Each of the subtasks may correspond to a different semantic category associated with the query. The subtasks may be executable by AI agent instances 132 of the agent network 130 to produce subtask outputs.

According to the method 300, to process 304 the query, the query response module 106 generates 320 subqueries based on the query and the generated subtasks. For example, generating the subqueries may include segmenting and/or rewriting the query into focused subqueries associated with the generated subtasks. One or more subqueries may be generated for each subtask. The subqueries may prompt the AI agent instances 132 of the agent network to produce the subtask outputs.

According to the method 300, to process 304 the query, the query response module 106 selects 322 one or more of the AI agent instances 132 to execute each of the generates subtasks. The AI agent instances 132 may be selected based on subtask parameters associated with the subtasks. For example, a subtask parameter may include a domain or topic associated with the subtask. An AI agent instance 132 trained for the domain or topic associated with the subtask may be selected to execute the subtask.

According to the method 300, to process 304 the query, the query response module 106 executes 324 the subtasks. To execute the subtasks, the query response module 106 and/or the agent call module 128 determines 326 access controls associated with the subtasks and calls 328 the selected AI agent instances 132 to execute the subtasks that the user has permission to access. The query response module 106 and/or the agent call module 128 may enable the selected AI agent instances 132 to compare 312 data to or otherwise reference the vector database 126 to facilitate execution of the subtasks. The query response module 106 and/or the agent call module 128 consolidates 330 the agent responses to produce the subtask outputs.

According to the method 300, to process 304 the query, the query response module 106 validates 332 the tasks based on analyzing the subtask outputs according to predefined criteria. The predefined criteria may include subtask output completeness, subtask output accuracy, and subtask output relevance. The query response module 106 may employ validation algorithms to analyze the subtask outputs.

According to the method 300, to process 304 the query, the query response module 106 formulates 336 task responses based on the subtask outputs. To formulate the task response, the query response module 106 may the transform raw or intermediate outputs from the AI agent instances 132 into coherent and contextually appropriate subtask responses that align with the requirements of the corresponding subtasks and their associated semantic categories.

According to the method 300, to process 304 the query, the query response module 106 generates 338 a structured response based on the task responses. The query response module 106 may generate the structured response by combining and/or consolidating the subtask responses using aggregation techniques and/or trained machine learning models.

According to the method 300, the response validation module 134 validates 340 the structured response. The response validation module 134 may receive the query response from the query response module 106 and evaluate it against validation criteria to confirm that the response comprehensively addresses each aspect of the query.

According to the method 300, the user interface 102 displays 342 the validated query response.

FIG. 4 is a flow diagram illustrating an embodiment of a method 400 for rendering multi-category query responses. The method 400 may be implemented using the system 100. Any aspects of the system 100 and/or method 400 may be combined with any of the other embodiments of the system and/or method disclosed herein, and vice versa.

In one embodiment, the method 400 includes receiving 402 a natural-language query from a remote user device. The method 400 further includes determining 404 a semantic embedding vector for the query using a domain-adapted transformer model. The method 400 further includes clustering 406 the embedding vector into K semantic clusters via k-means clustering, each semantic cluster corresponding to a subtask category. The method 400 further includes for each semantic cluster, selecting 408, a respective AI agent instance from a pool of N trained AI agent instances. The selection may be based on a stored task execution profile that indexes each AI agent instance by one or more capability vectors and a cosine-similarity calculation between a centroid vector of the semantic cluster and each of the one or more capability vectors. The method 400 further includes dispatching 410 the selected AI agent instances to execute the subtasks and determine the subtask responses. The method 400 further includes validating 412 each of the subtask responses based on predefined criteria. The method 400 further includes aggregating 414 validated subtask outputs into a final structured response by merging formatted partial results based on predefined merge rules. The method 400 further includes transmitting 416 the final structured to the remote user device for display via a user interface.

In another embodiment, the method 400 includes determining, by a semantic categorization module, semantic relevance scores for candidate semantic categories based on comparing the embedding vector of the query to stored embeddings associated with the candidate semantic categories and ranking the K semantic clusters based on the candidate semantic categories and the semantic relevance scores.

In another embodiment, the method 400 includes determining access controls associated with the query based on a credential from the remote user device and preventing access to candidate semantic categories not authorized by the access controls.

In another embodiment, the method 400 includes comparing the K clusters to a hierarchy model comprising a plurality of nodes representing domain-specific terms associated with the candidate semantic categories and edges connecting the nodes representing relationships between the corresponding domain-specific terms.

In another embodiment, the method 400 includes generating at least one subquery for each of the cluster-specific subtasks based on the cluster-specific subtasks and the query. The subqueries can prompt the agent instances to generate subtask the outputs based on executing the subtasks.

In another embodiment, the method 400 includes applying a validation algorithm to verify a completeness, accuracy, and relevance of each of the subtask outputs based on the corresponding semantic cluster and subtask category.

In another embodiment, the method 400 includes instructing at least one of the selected agent instances to re-execute a cluster-specific subtask based on a failed subtask output validation.

In another embodiment, the method 400 includes generating subtask responses by structuring the subtask outputs using a trained machine learning model.

In another embodiment, the method 400 includes determining the subtask parameters for each semantic cluster based on the corresponding subtask category. The subtask parameters for each semantic cluster may include one or more of a domain expertise, a computational complexity, or a data type requirement. The stored task execution profile of each AI agent instance may include one or more of a domain expertise, a computational capacity, and a data type compatibility.

In another embodiment, the method 400 includes routing the cluster-specific subtasks to the corresponding selected agent instances, referencing a vector database storing domain-specific terms, relationships, and metadata to facilitate execution of the cluster-specific subtasks by the selected agent instances, and consolidating subtask outputs generated by the selected agent instances executing the subtasks.

In another embodiment, the method 400 includes determining access controls associated with the query based on a credential from the remote user device and preventing, by the agent call module, execution of cluster-specific subtasks not authorized by the access controls.

In another embodiment, the method 400 includes storing the query and the final structured response in a trained neural network cache, retrieving the structured response from the trained neural network cache for a subsequent query determined to be semantically similar to the stored query, and generating a response for the subsequent query based on the final structured response from the trained neural network cache.

In another embodiment, the method 400 includes validating, prior to transmitting the final structured response to the remote user device, the final structured response by applying one or more of a rule-based algorithm to verify completeness and a semantic similarity analysis to verify relevance to the query.

In another embodiment, the pool of N trained AI agent instances is defined by an agent network. Each of the trained agent instances of the agent network may be trained based on domain specific data corresponding to candidate semantic categories.

In another embodiment, the method 400 includes obtaining the query via the user interface displayed by the remote user device. The user interface may be implemented as a web-based application.

The method 400 described in FIG. 4 may be implemented by the system 100, as described herein. With reference now to FIG. 4 in conjunction with FIG. 1, according one embodiment of the method 400, the execution control module 104 receives 402 a natural-language query from a remote user device. The execution control module 104 determines 404 a semantic embedding vector for the query using a domain-adapted transformer model. The execution control module 104 clusters 406 the embedding vector into K semantic clusters via k-means clustering. Each semantic cluster may correspond to a subtask category. The execution control module 104 selects 408, for each semantic cluster, a respective AI agent instance 132 from a pool of N trained AI agent instances 132. The selection may be based on a stored task execution profile that indexes each AI agent instance 132 by one or more capability vectors and a cosine-similarity calculation between a centroid vector of the semantic cluster and each of the one or more capability vectors. The execution control module 104 dispatches 410 each semantic cluster to a selected AI agent instance for processing. Each AI agent instance may execute a cluster-specific subtask on a dedicated central processing unit (CPU) thread. The execution control module 104 validates 412 each subtask output against predefined accuracy thresholds by computing a confidence score via the task validation module 118. The execution control module 104 aggregates 414 validated subtask outputs into a final structured response by merging formatted partial results based on predefined merge rules. The execution control module 104 transmits 416 the structured response to the remote user device for display via the user interface 102.

In another embodiment, the semantic categorization module 108 determines semantic relevance scores for candidate semantic categories based on comparing the embedding vector of the query to stored embeddings associated with the candidate semantic categories and ranks the K semantic clusters y based on the candidate semantic categories and the semantic relevance scores. The stored embeddings may be stored in the vector database 126

In another embodiment, the semantic categorization module 108 determines access controls associated with the query based on a credential from the remote user device and prevents access to candidate semantic categories not authorized by the access controls.

In another embodiment, the semantic categorization module 108 compares the K clusters to a hierarchy model comprising a plurality of nodes representing domain-specific terms associated with the candidate semantic categories and edges connecting the nodes representing relationships between the corresponding domain-specific terms.

In another embodiment, the subquery generation module 114 generates at least one subquery for each of the subtasks based on the subtasks and the query. The subqueries can prompt the AI agent instances 132 to generate subtask outputs based on executing the subtasks.

In another embodiment, the task validation module 118 applies a validation algorithm to verify a completeness, accuracy, and relevance of each of the subtask outputs based on the subtasks and the corresponding semantic categories.

In another embodiment, the task validation module 118, the task execution module 116, and/or the execution control module 104 instructs at least one of the selected AI agent instances 132 to re-execute a subtask based on a failed subtask response validation.

In another embodiment, the task response module 120 generates the subtask responses by structuring the subtask outputs using a trained machine learning model.

In another embodiment, each of the trained AI agent instances 132 includes a task execution profile. The agent selection module 112 matches the task execution profiles to the subtask parameters to select the AI agent instances.

In another embodiment, the agent selection module 112 determines the subtask parameters for each subtask based on the subtask and the corresponding semantic category. The subtask parameters for each subtask may include one or more of a domain expertise, a computational complexity, or a data type requirement. The task execution profile of each AI agent instance 132 may include one or more of a domain expertise, a computational capacity, and a data type compatibility.

In another embodiment, the agent call module 128 routes the cluster-specific subtasks to the corresponding selected AI agent instances, references the vector database 126 storing domain-specific terms, relationships, and metadata to facilitate execution of the cluster-specific subtasks by the selected AI agent instances 132, and consolidates subtask outputs generated by the selected AI agent instances 132 executing the subtasks.

In another embodiment, the agent call module 128 and/or the task execution module 116 determines access controls associated with the query based on a credential from the remote user device and prevents execution of subtasks not authorized by the access controls.

In another embodiment, the semantic categorization module 108 stores the query and the structured response in the cache 124, retrieves the structured response from the cache 124 for a subsequent query determined to be semantically similar to the stored query, and the response generation module 122 generates a response for the subsequent query based on the structured response from the cache 124.

In another embodiment, the response validation module 134 validates, prior to transmitting the structured response to the remote user device, the structured response by applying one or more of a rule-based algorithm to verify completeness and a semantic similarity analysis to verify relevance to the query.

In another embodiment, the execution control module 104 issues instructions to the semantic categorization module 108, the task generation module 110, the agent selection module 112, the task execution module 116, the task validation module 118, and the response generation module 122 for generating the structured response.

In another embodiment, the execution control module 104 operates as a cloud-based orchestration platform deployed as a set of microservices.

In another embodiment, each of the trained AI agent instances 132 are trained based on domain specific data corresponding to candidate semantic categories.

In another embodiment, the method 400 includes obtaining the query via the user interface 102 displayed by the remote user device.

Figure 5:
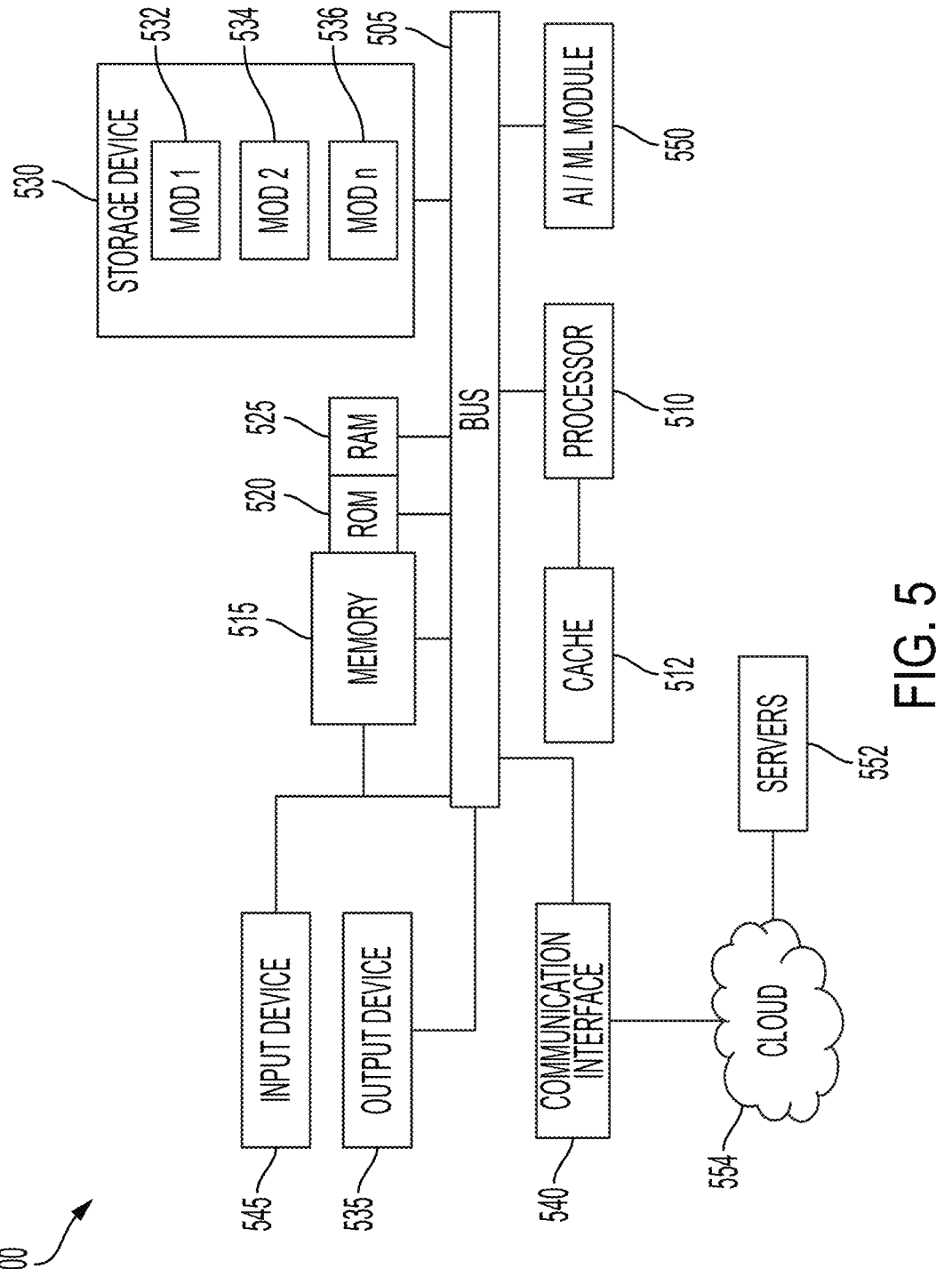
FIG. 5 illustrates an embodiment of a computing hardware environment for a multi-agent orchestration system for rendering multi-category query responses.

FIG. 5 illustrates embodiment of a hardware environment of a computing system 500 for a multi-agent orchestration system to generate responses to multi-category queries. The hardware environment of the computing system 600 may be optimized for implementing the complex operations for rendering responses to multi-category queries as described above in connection with FIGS. 1-4, integrating both a robust, modular hardware setup and a detailed processor-based computing system.

With reference to FIG. 5, the components of the hardware environment of the computing system 500 are in communication with each other using a system bus 505. The computing system 500 can include a processing unit (CPU or processor) 510 and a system bus 505 that may couple various system components including the system memory 515, such as a read only memory 520 (ROM) and random-access memory 525 (RAM), to the processor 510. The computing system 500 can include a cache 512 of high-speed memory connected directly with, in close proximity to, or integrated as part of the processor 510.

The computing system 500 can copy data from the system memory 515, ROM 520, RAM 525, and/or storage device 530 to the cache 512 for quick access by the processor 510. In this way, the cache 512 can provide a performance boost that avoids processor delays while waiting for data. These and other modules can control the processor 510 to perform various actions. Other system memory 515 may be available for use as well. The system memory 515 can include multiple different types of memory with different performance characteristics. The processor 510 can include any general-purpose processor and a hardware module or software module, such as module 1 532, module 2 534, up to module n 636 (where n is an integer greater than 2) stored in the storage device 530, to control the processor 510 as well as a special-purpose processor where software instructions are incorporated into the actual processor design. The processor 510 may essentially be a completely self-contained computing system, containing multiple cores or processors, a system bus, memory controller, cache, etc. A multi-core processor may be symmetric or asymmetric.

To enable user interaction with the computing system 500, an input device 545 can represent any number of input mechanisms, such as a microphone for speech, a touch-protected screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing system 500. The communications interface 540 can govern and manage the user input and system output. There may be no restriction on operating on any particular hardware arrangement and therefore the basic features here may easily be substituted for improved hardware or firmware arrangements as they are developed.

The storage device 530 can be a non-volatile memory and can be a hard disk or other types of computer readable media or storage which can store data that are accessible by a computer, such as magnetic cassettes, flash memory cards, solid state memory devices, digital versatile disks, cartridges, random access memory, read only memory, and hybrids thereof.

As discussed above, the storage device 530 can include the software modules 532, 534, 536 for controlling the processor 510. Other hardware or software modules are contemplated. The storage device 530 can be connected to the system bus 505. In some embodiments, a hardware module that performs a particular function can include a software component stored in a computer-readable medium in connection with the necessary hardware components, such as the processor 510, system bus 505, output device 535, and so forth, to carry out the function. For clarity of explanation, in some instances the present technology may be presented as including individual functional blocks including functional blocks comprising devices, device components, steps or routines in a method embodied in software, or combinations of hardware and software.

With reference to both FIG. 1 and FIG. 5, the system 100 for generating responses to multi-category queries can operate within a sophisticated, processor-based computing environment, such as the computing system 500, designed to perform categorization, task generation, agent selection, validation, and result generation operations with real-time precision.

The computing system 500 includes a multi-tiered memory architecture where the system memory 515 includes both read-only memory 520 (ROM) and random-access memory 525 (RAM). One aspect of the computing system 500 is its multi-layered storage infrastructure, anchored by the storage device 530. This storage device 530 includes various forms of non-volatile memory, such as solid-state drives (SSDs) and magnetic storage, housing critical data and software modules 532, 534, 536 that can control the processor 510 for executing various operations described in FIG. 1, for example. The storage device 530 can store complex software algorithms and machine learning models (e.g., any of the modules and/or machine learning algorithms discussed herein).

This configuration supports high-speed processing for tasks and data updates essential for dynamic operations for categorization, task generation, agent selection, validation, and result generation. While the ROM 520 provides core operational protocols and configurations, the high-speed RAM 525 enables the system to handle real-time updates to queries, content nodes, vector databases, etc. Furthermore, a storage device 530, including SSDs and magnetic storage, houses critical data and software modules necessary for executing categorization, task generation, agent selection, validation, and result generation functions. This storage system retains historical records, operational data, and machine learning models.

Artificial intelligence (AI) and machine learning (ML) modules 550 may be embedded within the computing system 500 to improve various processes related to categorization, task generation, agent selection, validation, and result generation. For example, AI and ML modules 550 may include any of the machine learning algorithms, models, and/or agents discussed further herein.

A suite of data collection and input/output (I/O) devices may be employed to monitor and interact with the system 100. Input devices 545, keyboards, mouses, touchscreens, microphone, cameras, RFID readers, and/or IoT sensors can capture real-time data. This data feeds into the processor 510 for seamless integration the computing system 600, enabling precise, on-the-fly adjustments. Output devices, such as digital displays, speakers, wearable alerts, and screens, provide real-time feedback to users. The range of input and output devices, including the input device 545 and the output device 535, can enable users to interact directly with the system 100, for example, via the user interface 102.

In various embodiments, the computing system 500 is extended and supported by a scalable cloud-based infrastructure 554, which provides scalable storage, processing power, and data analytics.

The scalable cloud-based infrastructure 554 also serves as the primary hub for inter-facility communication, linking regional facilities to a central command system that monitors and directs tasks across the network. When additional processing capacity is required, the system can dynamically allocate cloud resources, ensuring that computational workloads related to predictive analytics, complex task sequencing, and resource optimization are handled efficiently. Additionally, data redundancy protocols within the cloud architecture safeguard operational data, ensuring recovery from hardware failure or data loss scenarios.

The computing system 500 may be processor-based. The processor-based computing system operates within a cloud-enabled, modular hardware environment designed for scalability and high availability. This broader infrastructure can include additional AI-optimized processing units, such as TPUs and GPUs, which are capable of handling the intensive computational requirements of machine learning algorithms used for demand forecasting, slotting optimization, and real-time task adjustments. The modular cloud architecture ensures that each facility can access centralized data and processing power, dynamically adjusting workflows based on system demands. It also allows the modules to allocate resources optimally, whether from central servers or distributed cloud resource-specific processors, depending on task priorities and operational constraints.

The scalable cloud-based infrastructure 554 provides flexible storage, processing, and analytics capabilities across distributed facilities. Cloud integration supports storage of historical data, remote processing of compute-intensive machine learning models, and real-time data access for multiple facilities. Managed through containerized applications and virtual machines, the cloud framework can enable continuous software updates, enhanced disaster recovery, and dynamic resource allocation to accommodate varying operational demands. Cloud-based inter-facility communication ensures synchronized, efficient operations, with additional processing capacity allocated as needed.

Energy efficiency may be prioritized within the design of the system 100, with power management protocols integrated across hardware components to reduce the system's environmental impact. The distributed power architecture, supported by uninterruptible power supplies (UPS) and backup generators, ensures reliable operation and minimizes downtime, allowing the system to maintain continuity and efficiency during power disruptions.

The system 100 can include security protocols ensure data integrity, privacy, and compliance with regulatory standards. These include end-to-end encryption, multi-factor authentication, role-based access control, and real-time monitoring via firewalls and intrusion detection systems. An AI-based anomaly detection component monitors access patterns and data consistency, flagging unusual activities. Additionally, encrypted logging and audit trails facilitate transparency and compliance with regulations such as GDPR for data privacy, while data sovereignty protocols ensure that sensitive information meets regional compliance standards.

The computing system 500 can offer a comprehensive solution for categorization, task generation, agent selection, validation, and result generation operations, combining high-performance processing, advanced memory configurations, scalable cloud-based resources, and robust communication interfaces. The elements of the computing system 600 can establish a high-performance environment that supports continuous adaptation, precise task orchestration, and predictive optimization.

Within the context of this disclosure, the term "module" is used as a broad and flexible term to describe a component of the system that can be implemented using hardware, software, firmware, or a combination of these to perform one or more specific tasks or operations. A module may be implemented using various types of technology, including but not limited to:

Hardware: A physical device or circuit that executes predefined functions. Hardware modules may include, but are not limited to, processors (e.g., central processing units (CPUs), digital signal processors (DSPs), graphical processing units (GPUs)), memory components (RAM, ROM, flash memory), network interfaces, power management systems, or specialized chips such as application-specific integrated circuits (ASICs) or field-programmable gate arrays (FP-GAs). These components may be connected through buses, networks, or communication interfaces, providing the necessary infrastructure for high-speed data transfer and execution of operations.

Software: A set of instructions stored in memory and executed by processing units. Software modules may include executable code, dynamic link libraries (DLLs), software development kits (SDKs), virtual machine environments, or applications. These modules are responsible for implementing algorithms, data processing, decision-making logic, and user interface functionalities. Software modules can be written in various programming languages (e.g., C++, Python, Java) and can interact with other modules through well-defined APIs, middleware, or cloud-based services.

Firmware: Low-level code stored in non-volatile memory (e.g., EEPROM, flash memory) that bridges the gap between hardware and higher-level software. Firmware modules provide the control logic necessary to configure, initialize, and manage hardware devices. Firmware can handle essential tasks such as device bootstrapping, protocol handling, and power management. Firmware updates may be delivered remotely, enabling post-deployment enhancements and security patches without requiring hardware modifications.

Modules are capable of interacting with other modules via inter-module communication within the system through standard communication protocols such as Inter-Process Communication (IPC), message passing, remote procedure calls (RPC), or data buses. This allows for distributed operations across different hardware or software environments, whether local or over a network. The use of APIs, middleware layers, or network protocols (e.g., REST, gRPC) facilitates seamless communication between modules regardless of their underlying implementation.

Modules are designed with modularity and scalability features via a plug-and-play architecture, enabling the system to dynamically add, remove, or modify modules as needed. This modularity allows the system to scale efficiently, either horizontally (by adding more modules for parallel processing) or vertically (by enhancing the capabilities of individual modules). This feature is particularly useful in distributed computing environments, such as cloud platforms or multi-core processors.

Modules can be designed to support multi-threading, parallel execution, or distributed computing architectures, where tasks are split across multiple hardware resources (e.g., multi-core processors, distributed nodes). Load balancing and task synchronization mechanisms ensure efficient resource utilization, minimizing execution time for complex operations.

Modules can integrate AI-driven components such as machine learning models or neural networks to perform tasks like pattern recognition, decision-making, and predictive analytics. These AI modules can be pre-trained models or dynamically updated through continuous learning, depending on the application's requirements. Modules can leverage specialized AI hardware accelerators such as TPUs (Tensor Processing Units) or GPUs for high-performance processing.

For time-sensitive applications, modules may feature real-time processing capabilities, including low-latency processing, task prioritization, and event-driven architectures. Real-time operating systems (RTOS) or real-time task schedulers can be used within firmware or software modules to ensure that critical tasks are completed within specific time constraints.

Modules may incorporate security mechanisms such as encryption, authentication, and access control to protect data and ensure the integrity of operations. Secure hardware modules (e.g., Trusted Platform Modules (TPMs) or secure enclaves) may be used to store cryptographic keys and execute secure operations, while software-based modules may implement firewalls, intrusion detection systems (IDS), or secure communication protocols (e.g., TLS/SSL).

Modules may manage and store data using embedded databases, cloud storage services, or other data management and persistence mechanisms. Data synchronization across distributed systems may be supported through version control, replication strategies, and consistency models (e.g., eventual consistency, strong consistency).

Modules are adaptable for deployment in cloud environments or edge computing frameworks. Cloud-based modules can dynamically scale according to demand, leveraging elastic resources, while edge modules perform low-latency processing closer to the data source, reducing dependency on centralized cloud systems.

In environments where power consumption is critical (e.g., IoT devices or battery-operated systems), modules may include energy-efficient designs, such as power-aware algorithms, dynamic voltage scaling, sleep modes, or energy harvesting technologies. Hardware modules may implement low-power designs using specific semiconductor technologies optimized for minimal energy usage.

Each module may be designed to function as an independent, reusable component within a larger system architecture, while maintaining compatibility with other modules. This modular approach allows for flexibility in system design, enabling easy upgrades, extensions, and maintenance. Whether deployed on dedicated hardware, within virtualized environments, or across distributed networks, modules provide the foundational building blocks for the functionality of the system 100.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical storage, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method, performed by a server-based execution control module comprising at least one processor and a memory, for rendering enhanced multi-category query responses via orchestrated execution of trained artificial intelligent (AI) agent instances, the method comprising:

receiving, at the execution control module, a natural-language query from a remote user device;

determining, by the execution control module, a semantic embedding vector for the query using a domain-adapted transformer model;

clustering, by the execution control module, the embedding vector into K semantic clusters via k-means clustering, each semantic cluster corresponding to a subtask category;

for each semantic cluster, selecting, by the execution control module, a respective AI agent instance from a pool of N trained AI agent instances, the selection based on:

a stored task execution profile that indexes each AI agent instance by one or more capability vectors; and a cosine-similarity calculation between a centroid vector of the semantic cluster and each of the one or more capability vectors;

dispatching, by the execution control module, each semantic cluster to a selected AI agent instance for processing, wherein each AI agent instance executes a cluster-specific subtask on a dedicated central processing unit (CPU) thread;

validating, by the execution control module, each subtask output against predefined accuracy thresholds by computing a confidence score via a task validation module;

aggregating, by the execution control module, validated subtask outputs into a final structured response by merging formatted partial results based on predefined merge rules; and transmitting, by the execution control module, the final structured response to the remote user device for display via a user interface.

2. The method of claim 1, wherein clustering the embedding vector into K semantic clusters via k-means clustering comprises:

determining, by a semantic categorization module, semantic relevance scores for candidate semantic categories based on comparing the embedding vector of the query to stored embeddings associated with the candidate semantic categories; and ranking, by the semantic categorization module, the K semantic clusters based on the candidate semantic categories and the semantic relevance scores.

3. The method of claim 2, further comprising:

determining, by the semantic categorization module, access controls associated with the query based on a credential obtained by the user interface from the remote user device; and preventing, by the semantic categorization module, access to candidate semantic categories not authorized by the access controls.

4. The method of claim 2, further comprising comparing, by the semantic categorization module, the K semantic clusters a hierarchy model comprising a plurality of nodes representing domain-specific terms associated with the candidate semantic categories and edges connecting the nodes representing relationships between the corresponding domain-specific terms.

5. The method of claim 2, further comprising generating, by a subquery generation module, at least one subquery for each of the cluster-specific subtasks based on the cluster-specific subtasks and the query, wherein the subqueries are configured to prompt the AI agent instances to generate the subtask outputs based on executing the cluster-specific subtasks.

6. The method of claim 5, wherein validating each subtask output against predefined accuracy thresholds by computing a confidence score via a task validation module comprises applying, by a task validation module, a validation algorithm to verify a completeness, accuracy, and relevance of each of the subtask outputs based on the corresponding semantic cluster and subtask category.

7. The method of claim 6, further comprising instructing, by the execution control module, at least one of the selected AI agent instances to re-execute a cluster-specific subtask based on a failed subtask output validation.

8. The method of claim 5, further comprising generating, by a task response module, subtask responses by structuring the subtask outputs using a trained machine learning model.

9. The method of claim 1, further comprising determining, by an agent selection module, subtask parameters for semantic cluster based on the corresponding subtask category, wherein the subtask parameters for each semantic cluster comprise one or more of a domain expertise, a computational complexity, or a data type requirement, and wherein the stored task execution profile of each AI agent instance comprises one or more of a domain training, a computational capacity, and a data type compatibility.

10. The method of claim 1, wherein dispatching, by the execution control module, each cluster a selected AI agent instance for processing comprises:

routing, by an agent call module, the cluster-specific subtasks to the corresponding selected AI agent instances;

referencing, by the agent call module, a vector database storing domain-specific terms, relationships and metadata to facilitate execution of the cluster-specific subtasks by the selected AI agent instances; and consolidating, by the agent call module, subtask outputs generated by the selected agent instances.

11. The method of claim 10, further comprising:

determining, by the agent call module, access controls associated with the query based on a credential obtained by the user interface from the remote user device; and preventing, by the agent call module, execution of cluster-specific subtasks not authorized by the access controls.

12. The method of claim 1, further comprising:

storing, by a semantic categorization module, the query and the final structured response in a trained neural network cache;

retrieving, by the semantic categorization module, the final structured response from the trained neural network cache for a subsequent query determined to be semantically similar to the stored query; and generating, by a response generation module, a response for the subsequent query based on the final structured response from the trained neural network cache.

13. The method of claim 1, further comprising validating, by a response validation module prior to transmitting the final structured response to the remote user device, the final structured response by utilizing one or more of a rule-based algorithm to verify completeness and a semantic similarity analysis to verify relevance to the query.

14. The method of claim 1, wherein the execution control module is configured to issue instructions to a semantic categorization module, a task generation module, an agent selection module, a task execution module, a task validation module, and a response generation module for generating the final structured response.

15. The method of claim 1, wherein the execution control module is configured to operate as a cloud-based orchestration platform deployed as a set of microservices.

16. The method of claim 1, wherein the pool of N trained AI agent instances is defined by an agent network, and wherein each of the trained AI agent instances of the agent network are trained based on domain specific data corresponding to candidate semantic categories.

17. The method of claim 1, further comprising obtaining the query via the user interface displayed by the remote user device, wherein the user interface is implemented as a web-based application.

18. A non-transitory computer-readable medium storing instructions that, when executed by one or more processors, cause a computing system to:

receive a query from a remote user device;

determine a semantic embedding vector for the query using a domain-adapted transformer model;

cluster the embedding vector into K semantic clusters via k-means clustering, each semantic cluster corresponding to a subtask category;

for each semantic cluster, select a respective AI agent instance from a pool of N trained AI agent instances, the selection based on:

a stored task execution profile that indexes each AI agent instance by one or more capability vectors; and a cosine-similarity calculation between a centroid vector of the semantic cluster and each of the one or more capability vectors;

dispatch each cluster a selected AI agent instance for processing, wherein each AI agent instance executes a cluster-specific subtask on a dedicated central processing unit (CPU) thread;

validate each subtask output against predefined accuracy thresholds by computing a confidence score via a task validation module;

aggregate validated subtask outputs into a final structured response by merging formatted partial results based on predefined merge rules; and transmit the final structured response to the remote user device for display via a user interface.

\* \* \* \* \*